(12) United States Patent
Shimono et al.

(10) Patent No.: US 9,022,745 B2
(45) Date of Patent: May 5, 2015

(54) COMPOSITE MATERIAL PANEL STRUCTURE AND MANUFACTURING METHOD

(75) Inventors: Kodai Shimono, Tokyo (JP); Masakazu Kamibayashi, Tokyo (JP); Haruhiko Hirano, Tokyo (JP); Tomohiro Numajiri, Tokyo (JP); Kenji Ito, Yokohama (JP); Ikuo Honda, Yokohama (JP); Yoshihiro Fujioka, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 566 days.

(21) Appl. No.: 13/337,553

(22) Filed: Dec. 27, 2011

(65) Prior Publication Data

US 2012/0163990 A1 Jun. 28, 2012

(30) Foreign Application Priority Data

Dec. 27, 2010 (JP) ................................ 2010-291367

(51) Int. Cl.
*F03D 11/00* (2006.01)
*B29C 70/34* (2006.01)
*B29C 70/88* (2006.01)
(Continued)

(52) U.S. Cl.
CPC .......... *F03D 11/0033* (2013.01); *B29C 70/342* (2013.01); *B29C 70/885* (2013.01); *B29L 2031/7504* (2013.01); *B32B 5/028* (2013.01); *B32B 27/12* (2013.01); *B32B 2307/20* (2013.01); *Y02E 10/722* (2013.01); *Y02E 10/726* (2013.01)

(58) Field of Classification Search
CPC .... B29C 70/342; B29C 70/885; B32B 5/028; B32B 27/12; F03D 11/0033

USPC ........ 415/200, 121.3; 361/218; 264/510, 511, 264/571
See application file for complete search history.

(56) References Cited

U.S. PATENT DOCUMENTS 4,352,142 A * 9/1982 Olson ........................... 361/218
4,839,771 A * 6/1989 Covey ........................... 361/218
(Continued)

FOREIGN PATENT DOCUMENTS

JP 60184631 U 12/1985
JP 4232008 A 8/1992
(Continued)

OTHER PUBLICATIONS

Decision to Grant a Patent mailed Aug. 15, 2014, corresponding to Japanese patent application No. 2010-291367.

*Primary Examiner* — Nathaniel Wiehe
*Assistant Examiner* — Eldon Brockman
(74) *Attorney, Agent, or Firm* — Kanesaka, Berner & Partners (57) ABSTRACT

The present invention provides a composite material panel structure and a manufacturing method thereof with which an anti-lightning function can be realized without adding a separate anti-lightning structure to the composite material panel structure. In a composite material panel structure formed from a composite material panel containing reinforcing fibers, the composite material panel includes: a fiber-reinforced base material impregnated with a matrix resin; a conductive mesh sheet disposed on one surface side of the fiber-reinforced base material; and a bag film disposed on the one surface side of the fiber-reinforced base material so as to sandwich the conductive mesh sheet. The conductive mesh sheets of a plurality of the composite material panels are electrically connected to each other.

10 Claims, 8 Drawing Sheets

(51) Int. Cl.
*B32B 5/02* (2006.01)
*B32B 27/12* (2006.01)
*B29L 31/00* (2006.01)

(56) References Cited

U.S. PATENT DOCUMENTS

| | | | | |
|---|---|---|---|---|
| 6,327,132 | B1* | 12/2001 | Andrivet et al. | 361/218 |
| 7,307,825 | B2* | 12/2007 | De La Fuente De Ana et al. | 361/212 |
| 7,628,879 | B2* | 12/2009 | Ackerman | 156/98 |
| 2002/0108704 | A1* | 8/2002 | Umezawa et al. | 156/245 |
| 2007/0194491 | A1* | 8/2007 | Krogager et al. | 264/258 |
| 2007/0257152 | A1* | 11/2007 | Bergerson et al. | 244/133 |
| 2009/0257881 | A1* | 10/2009 | Ostergaard Kristensen et al. | 416/229 R |
| 2010/0103582 | A1* | 4/2010 | Shimp et al. | 361/220 |
| 2010/0151239 | A1* | 6/2010 | Hebert et al. | 428/351 |
| 2011/0014356 | A1* | 1/2011 | Fornes et al. | 427/58 |

FOREIGN PATENT DOCUMENTS

| | | |
|---|---|---|
| JP | 7214680 A1 | 8/1995 |
| JP | 2000265938 A1 | 9/2000 |
| JP | 2004245174 A | 9/2004 |
| JP | 2005171916 A1 | 6/2005 |
| JP | 2006219078 A | 8/2006 |
| JP | 2010115837 A | 5/2010 |

\* cited by examiner

Fig. 9

COMPOSITE MATERIAL PANEL STRUCTURE AND MANUFACTURING METHOD

RELATED APPLICATIONS

The present application is based on, and claims priority from, Japanese Application Number 2010-291367, filed Dec. 27, 2010, the disclosure of which is hereby incorporated by reference herein in its entirety.

BACKGROUND OF THE INVENTION

1. Field of the Invention

The present invention relates to a composite material panel structure having an anti-lightning function, which is formed from a composite material panel containing reinforcing fibers and used as a member such as a wind turbine nacelle cover, an aircraft, an automobile, a ship or a railway vehicle, and relates to a manufacturing method thereof.

2. Description of the Related Art

A resin-based composite material (to be referred to simply as a "composite material" hereafter) containing reinforcing fibers is greatly advantaged due to its low weight, and therefore recent years have witnessed rapid advancements in the application of this composite material to members such as wind turbine nacelle covers, aircraft, automobiles, ships, and railway vehicles.

An autoclave molding method in which a bag film is placed over a plurality of laminated prepreg material sheets, whereupon the resulting component is subjected to pressurization molding through vacuum suction and then subjected to further pressurization, heating, and curing in an autoclave is known as a method of manufacturing the composite material.

For example, Japanese Patent Application Publication No. H7-214680 discloses a method of manufacturing a fiber-reinforced resin composite material. In this manufacturing method, a thermoplastic resin film is laminated onto a prepreg, heat is applied thereto under pressure in order to cure the resin, whereupon the thermoplastic resin film is peeled away such that a roughened surface is formed on the surface. Further, a constitution in which another material, for example metal foil, a metal plate, or the like, is laminated onto an inner layer part of the prepreg is described.

In an autoclave molding method, baking and curing are performed while applying pressure using an autoclave, and therefore a strong composite material is obtained. However, since this method requires an autoclave, which is a large-scale facility, an increase in cost occurs, and therefore the method is not suited to mass production.

Hence, a vacuum assisted resin transfer molding (VaRTM) method not requiring large-scale facilities has attracted a great deal of attention as a method of manufacturing a composite material.

A typical conventional vacuum assisted resin transfer molding method will now be described.

Figure 8A:
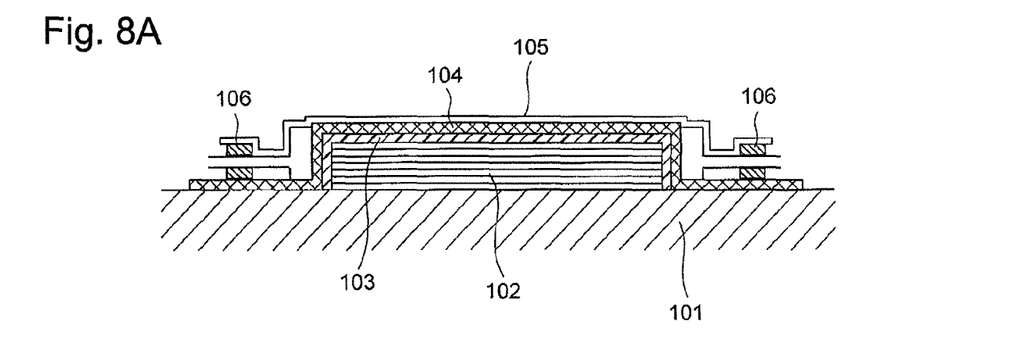
FIG. 8 is a view illustrating a conventional vacuum assisted resin transfer molding method.
Figure 8B:
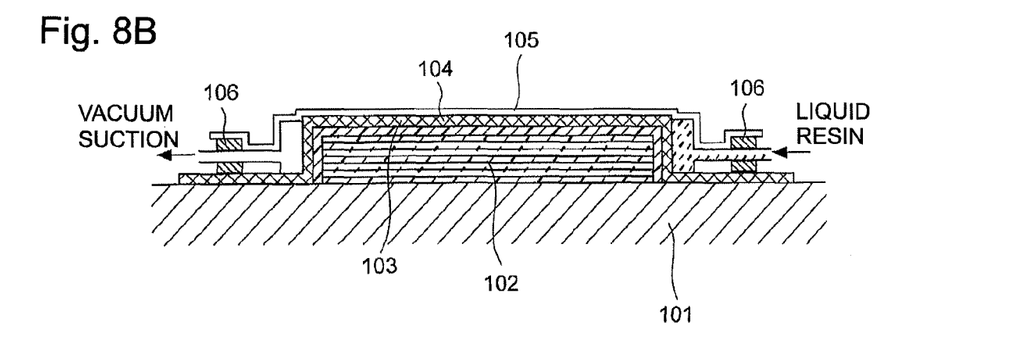

First, as shown in FIG. 8A, a mold releasing film 103 is disposed on a fiber-reinforced base material 102 placed in a mold 101. Next, a mesh sheet (a flow medium) 104 is disposed on the mold releasing film 103, whereupon the resulting member is covered by a bag film 105. End portions of the bag film 105 are tightly sealed by sealing members 106. Next, as shown in FIG. 8B, an inner side of the bag film 105 is subjected to vacuum suction, whereupon a liquid resin is injected into an interior of the bag film 105 and cured. After the resin has been cured, the mesh sheet 104 and the bag film 105 are removed by peeling away the mold releasing film 103.

Figure 8C:
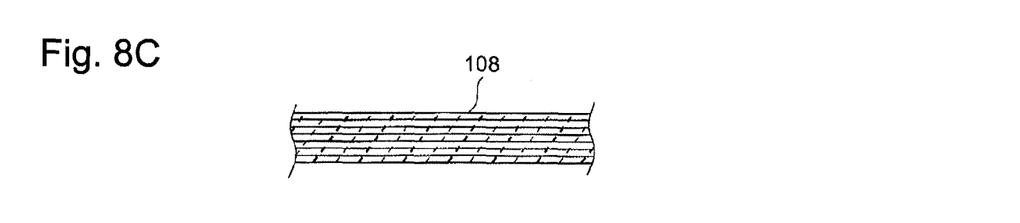

FIG. 8C shows a composite material panel 108 constituted by the fiber-reinforced base material impregnated with the resin, which is obtained through the method described above.

When a plurality of these composite material panels are coupled for use as a cover of a large structure disposed outdoors or a component of an outer wall, lightning may cause damage which extends to internal devices, and therefore measures must be taken to provide resistance against lightning.

Figure 9:
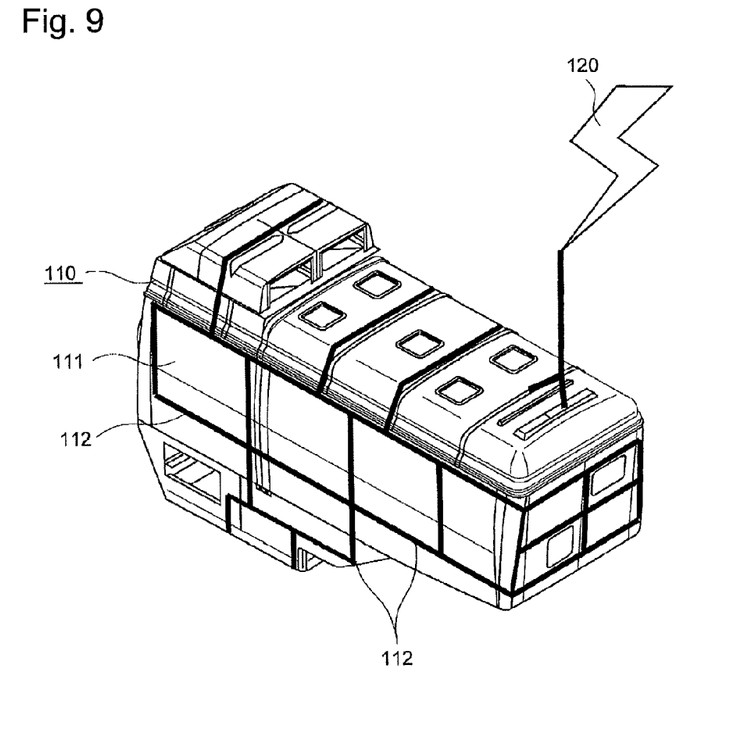
FIG. 9 is a perspective view of a wind turbine nacelle cover including a conventional anti-lightning structure.

A wind turbine nacelle cover, for example, includes an anti-lightning structure such as that shown in FIG. 9. In the drawing, a nacelle cover 110 is formed from a plurality of coupled composite material panels 111. The composite material panels 111 are typically non-conductive, and therefore a shield wire 112 is disposed inside the nacelle cover 110. When a lightning bolt 120 strikes, a current is released to the ground via the shield wire 112.

CITATION LIST

[Patent Document]
[Patent Document 1] Japanese Patent Application Publication No. H7-214680

SUMMARY OF THE INVENTION

Technical Problem

In the anti-lightning structure for the wind turbine nacelle cover shown in FIG. 9, however, the shield wire must be disposed separately after assembling the composite material panel structure, and a resulting disposal operation is both laborious and costly.

Hence, in a conventional composite material panel structure, the composite material panels are non-conductive, and therefore an anti-lightning structure must be disposed separately, leading to increases in labor and cost.

Meanwhile, Japanese Patent Application Publication No. H7-214680 discloses a constitution in which the composite material is made conductive by laminating metal foil, a metal plate, or the like onto the inner layer part of the prepreg. However, the metal foil, metal plate, or the like is not provided as an anti-lightning structure, and since the respective composite material panels remain electrically independent of each other, the current of the lightning bolt cannot be released. Further, when the metal foil or metal plate is laminated, a weight of the composite material panel increases, and therefore the composite material panel is not suitable for large structures.

The present invention has been designed in consideration of these problems in the related art, and an object thereof is to provide a composite material panel structure and a manufacturing method thereof with which an anti-lightning function can be realized without adding a separate anti-lightning structure to the composite material panel structure.

Solution to Problem

To solve the problems described above, a composite material panel structure according to the present invention is a composite material panel structure formed from a composite material panel containing reinforcing fibers, the composite material panel including: a fiber-reinforced base material impregnated with a matrix resin; a conductive mesh sheet disposed on one surface side of the fiber-reinforced base material; and a bag film disposed on the one surface side of the fiber-reinforced base material so as to sandwich the conductive mesh sheet, wherein the conductive mesh sheets of a plurality of the composite material panels are electrically connected to each other.

According to the present invention, the composite material panel includes the conductive mesh sheet, and by electrically connecting the conductive mesh sheets of a plurality of the composite material panels to each other, a lightning current path can be formed in the composite material panel structure such that an anti-lightning function is realized by the composite material panels themselves. Hence, a separate anti-lightning structure such as a shield wire is not required, and therefore a reduction in equipment cost can be achieved.

Further, the conductive mesh sheet can be used both to form the lightning current path in the composite material panel structure and to cause a liquid resin to diffuse through and permeate the fiber-reinforced base material during a composite material panel manufacturing process, and therefore the conductive mesh sheet can be used effectively both during and after manufacture. Furthermore, when the liquid resin is diffused during manufacture of the composite material panel structure, the matrix resin is charged into mesh holes of the conductive mesh sheet such that the fiber-reinforced base material is bonded sufficiently to the conductive mesh sheet. Hence, there is no danger of the mesh sheet becoming dislodged from the composite material panel structure. Moreover, the conductive mesh sheet takes a mesh form and is therefore lightweight and can be disposed over a large surface area. As a result, a reduction in the weight of the composite material panel structure can be achieved.

Note that in the composite material panel structure, the "fiber-reinforced base material" may be a base material constituted by dry fibers not impregnated with resin or a prepreg in which the fibers are impregnated with resin. Further, the "conductive mesh sheet" may be partially coated or impregnated with resin in advance.

Further, the composite material panel preferably includes a conductive connecting end on which an end portion of the conductive mesh sheet is exposed, and the conductive connecting ends of adjacent composite material panels preferably contact each other.

By bringing the conductive connecting ends of the adjacent composite material panels into direct contact with each other in this manner, the conductive mesh sheets can be electrically connected to each other by a simple constitution.

Further, the composite material panel preferably includes a conductive connecting end formed by exposing an end portion of the conductive mesh sheet, and the conductive connecting ends of a plurality of the composite material panels are preferably electrically connected to each other via a conductive member.

By electrically connecting the conductive connecting ends of the plurality of composite material panels to each other via the conductive member in this manner, the conductive member can be used to connect the composite material panels electrically even when the composite material panels are removed from each other.

Furthermore, the conductive member is preferably a coupling tool for coupling a plurality of the composite material panels.

By employing the conductive member as both an electric connector and a coupling tool for coupling the composite material panels to each other, a number of components of the composite material panel structure can be reduced.

Furthermore, a wind turbine generator according to the present invention includes a nacelle cover which is constituted by the composite material panel structure described above.

The wind turbine nacelle cover is disposed in a high location several tens of meters above the ground, for example, and is therefore likely to be affected by lightning. Hence, when the constitution according to the present invention is applied to a wind turbine nacelle cover, a lightweight, low cost wind turbine nacelle cover having an anti-lightning function can be provided.

A manufacturing method for a composite material panel structure according to the present invention is a manufacturing method for a composite material panel structure formed from a composite material panel containing reinforcing fibers, including: a laminating step of placing a fiber-reinforced base material in a mold and disposing a conductive mesh sheet on an upper surface of the fiber-reinforced base material; a covering step of covering the fiber-reinforced base material and the conductive mesh sheet with a bag film; a pressure reducing step of reducing a pressure in a molding space formed between the mold and the bag film; a resin introducing step of introducing a matrix resin into the reduced-pressure molding space; a curing step of curing the matrix resin; a mold removing step of removing a composite material panel obtained by integrating the fiber-reinforced base material, the conductive mesh sheet, and the bag film from the mold when the matrix resin is cured; and a connecting step of electrically connecting the conductive mesh sheets of a plurality of the composite material panels to each other.

According to the present invention, in a manufacturing method employing a vacuum assisted resin transfer method, the conductive mesh sheet is disposed on the upper surface of the fiber-reinforced base material in the laminating step, and using the conductive mesh sheet, the liquid resin can be caused to diffuse through and permeate the fiber-reinforced base material in the resin introducing step.

Further, according to the present invention, a mold releasing film is not disposed on the upper surface of the fiber-reinforced base material in the laminating step, and in the mold removing step, the fiber-reinforced base material, conductive mesh sheet, and bag film are removed from the mold integrally such that the conductive mesh sheet remains in the composite material panel. Furthermore, in the connecting step, the plurality of remaining conductive mesh sheets are electrically connected to each other. As a result, a lightning current path can be formed in the composite material panel structure such that an anti-lightning function is realized by the composite material panels themselves. Moreover, a step of providing a separate anti-lightning structure such as a shield wire is not required as a step of the structure manufacturing method, and therefore a reduction in cost can be achieved.

Effects of the Invention

According to the present invention described above, the composite material panel includes the conductive mesh sheet, and by electrically connecting the conductive mesh sheets of a plurality of the composite material panels to each other, a lightning current path can be formed in the composite material panel structure such that an anti-lightning function is realized by the composite material panels themselves. Hence, a separate anti-lightning structure such as a shield wire is not required, and therefore a reduction in equipment cost can be achieved.

Further, the conductive mesh sheet can be used both to form the lightning current path in the composite material panel structure and to cause the liquid resin to diffuse through and permeate the fiber-reinforced base material during the composite material panel manufacturing process, and therefore the conductive mesh sheet can be used effectively both during and after manufacture. Furthermore, the conductive mesh sheet takes a mesh form and is therefore lightweight and can be disposed over a large surface area. As a result, a reduction in the weight of the composite material panel structure can be achieved.

BRIEF DESCRIPTION OF THE DRAWINGS

FIG. 2 is a view showing a first constitutional example of a connecting structure for a conductive mesh sheet according to this embodiment, wherein

FIG. 5 is a view showing a fourth constitutional example of the connecting structure for the conductive mesh sheet according to this embodiment, wherein

FIG. 7 is a view showing a wind turbine nacelle cover serving as an example of an application of this embodiment, wherein

DESCRIPTION OF THE PREFERRED EMBODIMENTS

Preferred exemplary embodiments of the present invention will be described in detail below with reference to the drawings. Note, however, that unless specific description is provided to the contrary, dimensions, materials, shapes, relative arrangements, and so on of constitutional components described in the embodiments are merely illustrative examples, and are not intended to limit the scope of the present invention.

A composite material panel structure according to an embodiment of the present invention is formed from composite material panels containing reinforcing fibers, and has an anti-lightning function. The composite material panel structure is used as a member such as a wind turbine nacelle cover, an aircraft, an automobile, a ship, or a railway vehicle, for example.

Figure 1A:
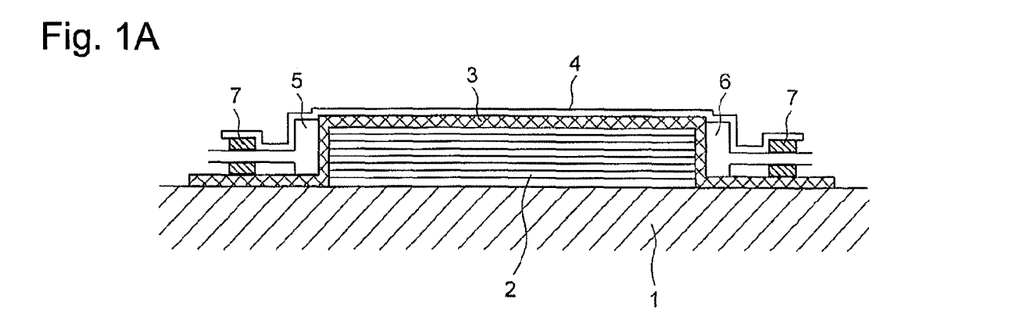
FIG. 1 is a view illustrating a method of manufacturing a composite material panel structure according to an embodiment.
Figure 1B:
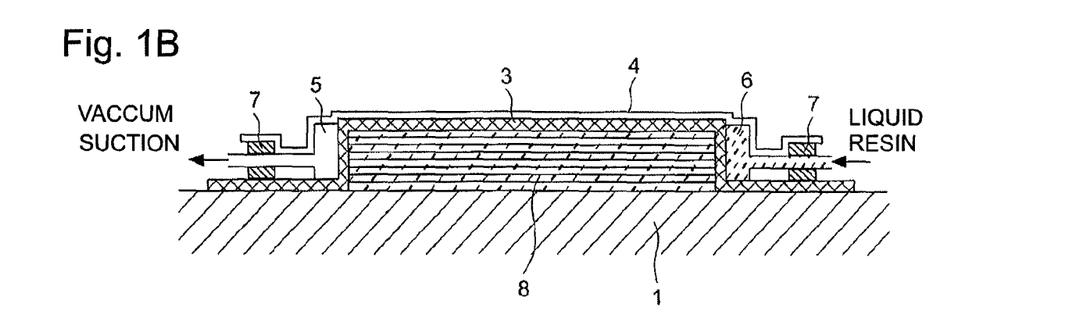
Figure 1C:
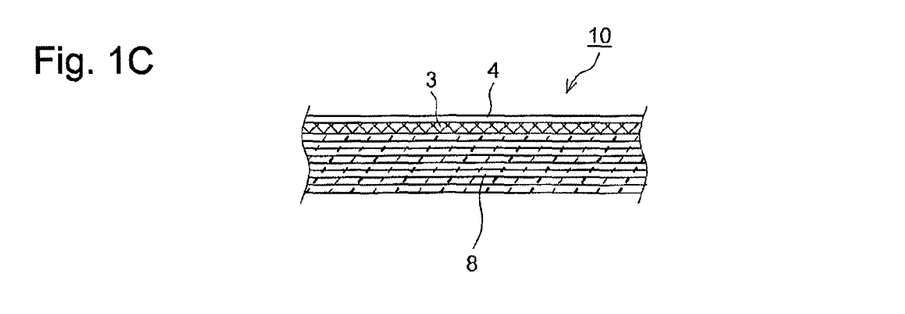

As shown in FIG. 1C, the composite material panel structure according to this embodiment of the present invention is formed from a composite material panel 10 containing reinforcing fibers.

The composite material panel 10 includes a fiber reinforced base material 8 impregnated with a matrix resin, a conductive mesh sheet 3 disposed on one surface side of the fiber-reinforced base material 8, and a bag film 4 disposed on the one surface side of the fiber-reinforced base material 8 so as to sandwich the conductive mesh sheet (a flow medium) 3.

Note that the fiber-reinforced base material 8 may be a base material constituted by dry fibers not impregnated with resin or a prepreg in which the fibers are impregnated with resin. Further, copper, aluminum, steel, carbon, and so on may be used as a material of the conductive mesh sheet 3. Furthermore, the conductive mesh sheet 3 may be partially coated or pre-impregnated with resin. When the conductive mesh sheet 3 is made of steel, an improvement in the strength of the composite material panel 10 can be achieved.

Moreover, as shown in FIG. 2, for example, an anti-lightning function is realized in the composite material panel structure by electrically connecting conductive mesh sheets 3a, 3b of a plurality of composite material panels 10a, 10b to each other.

A method of manufacturing the composite material panel structure according to this embodiment of the present invention will now be described with reference to FIGS. 1A to 1C.

First, in a lamination process, as shown in FIG. 1A, a fiber-reinforced base material 2 is placed on a mold 1, and the conductive mesh sheet 3 is disposed on an upper surface of the fiber-reinforced base material 2. Using the conductive mesh sheet 3, a liquid resin can be caused to diffuse through and permeate the fiber-reinforced base material 2 in a resin introduction process to be described below. Well known fibers such as carbon fibers, aramid fibers, or glass fibers, for example, may be used as the fibers constituting the fiber-reinforced base material 2.

Next, in a covering process, the fiber-reinforced base material 2 and the conductive mesh sheet 3 are covered by a bag film 4. More specifically, the bag film 4, which is provided with a suction port 5 and an injection port 6, is placed over the fiber-reinforced base material 2, whereupon a space (a molding space) surrounded by the bag film 4 and the mold 1 is tightly sealed by sealing members 7.

Next, in a pressure reducing process, as shown in FIG. 1C, a vacuum pump is connected to the suction port 5 and used to reduce a pressure in the molding space.

Further, in the resin introduction process, a liquid matrix resin is injected into the reduced-pressure molding space through the injection port 6. Note that the matrix resin may be a thermosetting resin such as unsaturated polyester, epoxy resin, polyamide resin, or phenol resin, or a thermoplastic resin represented by polybutylene terephthalate. When a thermoplastic resin is used as the matrix resin, the matrix resin is melted, injected into the molding space, and caused to permeate the fiber-reinforced base material 2.

Next, in a curing process, the fiber-reinforced base material 8 impregnated with the matrix resin is cured. More specifically, when the matrix resin is a thermosetting resin, the matrix resin is cured by a reaction under a heated condition or a room temperature condition. When the matrix resin is a thermoplastic resin, on the other hand, the molten matrix resin is cooled and cured.

Next, in a mold removing process, as shown in FIG. 10, the composite material panel 10 obtained by integrating the fiber-reinforced base material 8, the conductive mesh sheet 3, and the bag film 4 is removed from the mold 1.

Further, in a connecting process, the conductive mesh sheets 3 of a plurality of the composite material panels 10 are electrically connected to each other.

In the manufacturing method for a composite material panel structure according to this embodiment, a mold releasing film is not disposed on the upper surface of the fiber-reinforced base material 2 in the lamination process, and in the mold removing process, the fiber-reinforced base material 2, conductive mesh sheet 3, and bag film 4 are removed from the mold 1 integrally such that the conductive mesh sheet 3 remains in the composite material panel 10. Further, in the connecting process, the plurality of remaining conductive mesh sheets 3 are electrically connected to each other. As a result, a lightning current path can be formed in the composite material panel structure such that an anti-lightning function is realized by the composite material panels themselves. Moreover, a process of providing a separate anti-lightning structure such as a shield wire is not required as a process of the structure manufacturing method, and therefore a reduction in cost can be achieved.

FIGS. 2 to 5 show constitutional examples of connecting structures for the conductive mesh sheet according to this embodiment.

Figure 2A:
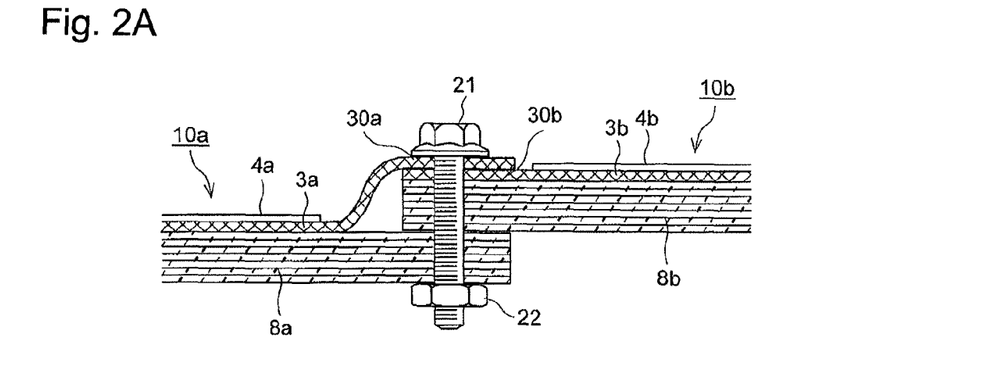
FIG. 2A is an enlarged sectional view of the composite material panel structure and FIG. 2B is a perspective view of the composite material panel structure.
Figure 2B:
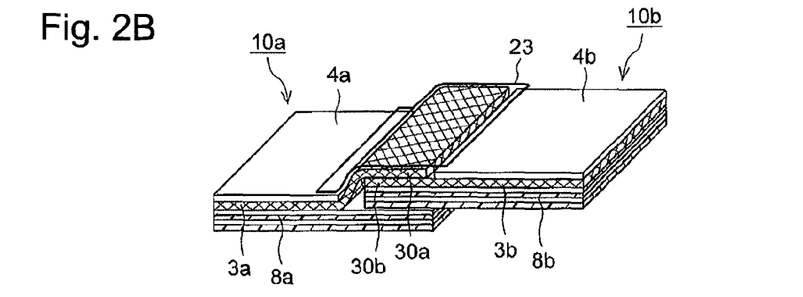

FIG. 2 is a view showing a first constitutional example of a connecting structure for the conductive mesh sheet according to this embodiment, wherein FIG. 2A is an enlarged sectional view of the composite material panel structure and FIG. 2B is a perspective view of the composite material panel structure.

In the first constitutional example, the composite material panels 10a, 10b include conductive connecting ends 30a, 30b on which end portions of the conductive mesh sheets 3a, 3b are exposed, and the conductive connecting ends 30a, 30b of the adjacent composite material panels 10a, 10b contact each other.

More specifically, in the adjacent composite material panel 10a on one side, the conductive connecting end 30a on which the end portion of the conductive mesh sheet 3a is exposed and a fiber-reinforced base material 8a impregnated with a matrix resin are peeled away. The adjacent composite material panel 10b on the other side is then sandwiched between the conductive connecting end 30a and the fiber-reinforced base material 8a. At this time, the conductive connecting ends 30a, 30b are in direct contact with each other. Further, the conductive connecting end 30a, the conductive connecting end 30b, the fiber-reinforced base material 8a, and a fiber-reinforced base material 8b, which are laminated as described above, are fastened by a bolt 21 and a nut 22 so as to be fixed integrally. To increase a degree of contact between the conductive connecting ends 30a, 30b at this time, as shown in FIG. 2B, the conductive connecting ends 30a, 30b may be adhered to each other fixedly using an adhesive resin sheet 23. Alternatively, a flat plate-shaped retaining plate (not shown in the drawing) for pressing together the conductive connecting ends 30a, 30b fixedly may be disposed between a bolt crown portion and the conductive connecting end 30a. Note that the bolt 21 and the nut 22 are not shown in FIG. 2B.

As a method of exposing the conductive mesh sheets 3a, 3b of the composite material panels 10a, 10b, the conductive connecting ends 30a, 30b may be formed by removing bag films 4a, 4b forming outermost layers of the respective composite material panels 10a, 10b after molding the composite material panels. Alternatively, a mold releasing film may be interposed partially between the fiber-reinforced base materials 8a, 8b and end portions of the conductive mesh sheets 3a, 3b when molding the composite material panels, and the conductive connecting ends 30a, 30b may be formed by removing the mold releasing film following molding.

By bringing the conductive connecting ends 30a, 30b of the adjacent composite material panels 10a, 10b into direct contact with each other in this manner, the conductive mesh sheets 3a, 3b can be electrically connected to each other by a simple constitution.

Figure 3:
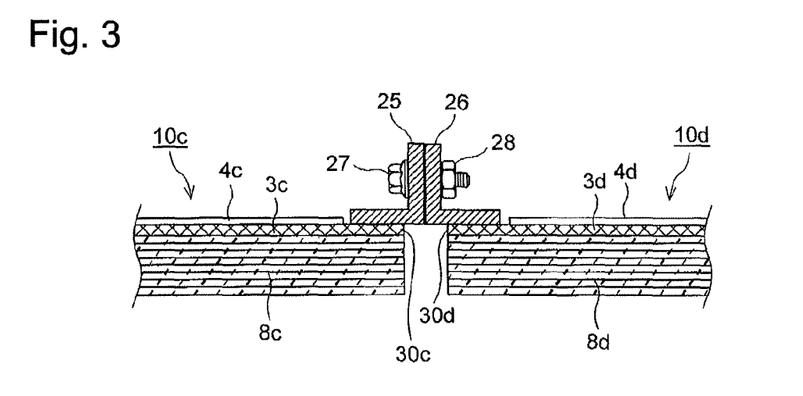
FIG. 3 is an enlarged sectional view showing a second constitutional example of the connecting structure for the conductive mesh sheet according to this embodiment.

FIG. 3 is an enlarged sectional view showing a second constitutional example of the connecting structure for the conductive mesh sheet according to this embodiment.

In the second constitutional example, composite material panels 10c, 10d include conductive connecting ends 30c, 30d formed by exposing end portions of conductive mesh sheets 3c, 3d, and the conductive connecting ends 30c, 30d of the plurality of composite material panels 10c, 10d are electrically connected to each other via conductive members 25, 26.

More specifically, a steel angle 25 is fixed to the conductive connecting end 30c of one composite material panel 10c, and a steel angle 26 is fixed to the conductive connecting end 30d of the other composite material panel 10d. The steel angles 25, 26 are fastened to each other by a nut 27 and a bolt 28. With this constitution, the composite material panels 10c, 10d are coupled to each other and the conductive connecting ends 30c, 30d are electrically connected to each other. Note that here, a steel angle was cited as an example of a coupling tool, but the present invention is not limited thereto.

By electrically connecting the conductive connecting ends 30c, 30d of the plurality of composite material panels 10c, 10d to each other via the conductive members 25, 26 in this manner, the conductive members 25, 26 can be used to connect the composite material panels 10c, 10d electrically even when the composite material panels 10c, 10d are removed from each other.

Further, by employing the conductive members 25, 26 as both electric connectors and coupling tools for coupling the composite material panels 10c, 10d to each other, a number of components of the composite material panel structure can be reduced.

Figure 4:
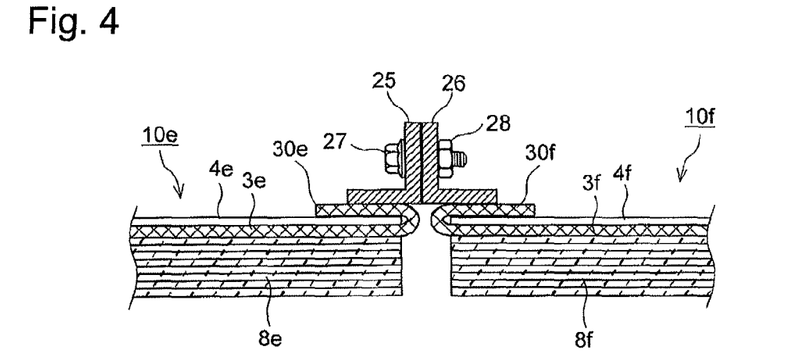
FIG. 4 is an enlarged sectional view showing a third constitutional example of the connecting structure for the conductive mesh sheet according to this embodiment.

FIG. 4 is an enlarged sectional view showing a third constitutional example of the connecting structure for the conductive mesh sheet according to this embodiment.

In the third constitutional example, similarly to the second constitutional example, composite material panels 10e, 10f include conductive connecting ends 30e, 30f formed by exposing end portions of conductive mesh sheets 3e, 3f, and the conductive connecting ends 30e, 30f of the plurality of composite material panels 10e, 10f are electrically connected to each other via the conductive members 25, 26.

More specifically, the end portions of the conductive mesh sheets 3e, 3f project from end portions of the composite material panels 10e, 10f to form the conductive connecting ends 30e, 30f. The conductive connecting ends 30e, 30f are then bent back respectively so as to sandwich bag films 4e, 4f.

The steel angles 25, 26 are fixed respectively to the bent back conductive connecting ends 30e, 30f. The steel angles 25, 26 are fastened to each other by the bolt 27 and the nut 28. With this constitution, the composite material panels 10e, 10f are fastened to each other and the conductive connecting ends 30e, 30f are electrically connected to each other.

By electrically connecting the conductive connecting ends 30e, 30f of the plurality of composite material panels 10e, 10f to each other via the conductive members 25, 26 in this manner, the conductive members 25, 26 can be used to connect the composite material panels 10e, 10f electrically even when the composite material panels 10e, 10f are removed from each other.

Further, by employing the conductive members 25, 26 as both electric connectors and coupling tools for coupling the composite material panels 10e, 10f to each other, the number of components of the composite material panel structure can be reduced.

Figure 5A:
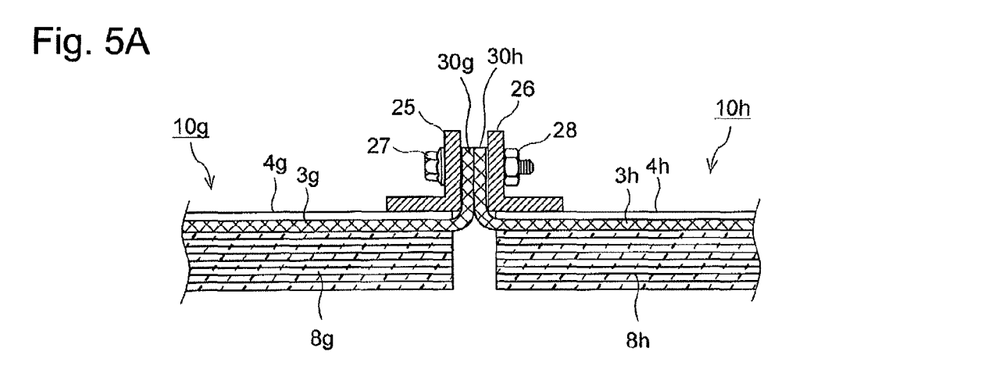
FIG. 5A is an enlarged sectional view of the composite material panel structure and FIG. 5B is a perspective view of the composite material panel structure.
Figure 5B:
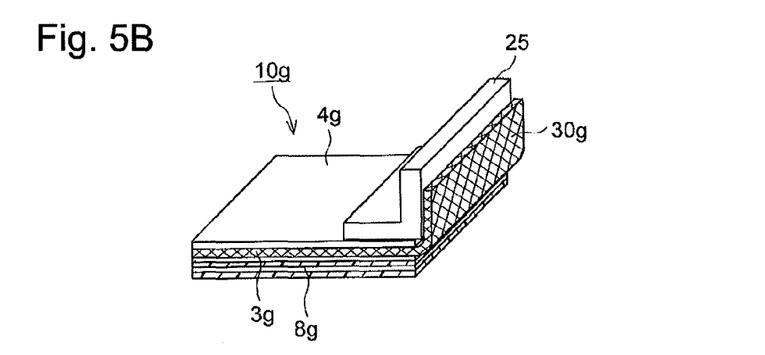

FIG. 5 is a view showing a fourth constitutional example of the connecting structure for the conductive mesh sheet according to this embodiment, wherein FIG. 5A is an enlarged sectional view of the composite material panel structure and FIG. 5B is a perspective view of the composite material panel structure.

In the fourth constitutional example, similarly to the first constitutional example, composite material panels 10g, 10h include conductive connecting ends 30g, 30h formed by exposing end portions of conductive mesh sheets 3g, 3h, and the conductive connecting ends 30g, 30h are electrically connected to each other through direct contact.

More specifically, the end portions of the conductive mesh sheets 3g, 3h project from end portions of the composite material panels 10g, 10h to form the conductive connecting ends 30g, 30h. The conductive connecting ends 30g, 30h are respectively bent into right angles and brought into surface contact with each other. A resulting contact site is sandwiched by the steel angles 25, 26 and fastened by the bolt 27 and the nut 28. Note that in this constitutional example, the coupling tool need not be made of a conductive material.

By bringing the conductive connecting ends 30g, 30h of the adjacent composite material panels 10g, 10h into direct contact with each other in this manner, the conductive mesh sheets 3g, 3h can be electrically connected to each other by a simple constitution.

With the composite material panel structure according to this embodiment, as described above, the composite material panel includes the conductive mesh sheet, and by electrically connecting the conductive mesh sheets of a plurality of the composite material panels to each other, a lightning current path can be formed in the composite material panel structure such that an anti-lightning function is realized by the composite material panels themselves. Hence, a separate anti-lightning structure such as a shield wire is not required, and therefore a reduction in equipment cost can be achieved.

Further, the conductive mesh sheet can be used both to form the lightning current path in the composite material panel structure and to cause the liquid resin to diffuse through and permeate the fiber-reinforced base material during the composite material panel manufacturing process, and therefore the conductive mesh sheet can be used effectively both during and after manufacture. Furthermore, when the liquid resin is diffused during manufacture of the composite material panel structure, the matrix resin is charged into mesh holes of the conductive mesh sheet such that the fiber-reinforced base material is bonded sufficiently to the conductive mesh sheet. Hence, there is no danger of the mesh sheet becoming dislodged from the composite material panel structure. Moreover, the conductive mesh sheet takes a mesh form and is therefore lightweight and can be disposed over a large surface area. As a result, a reduction in the weight of the composite material panel structure can be achieved.

Figure 6:
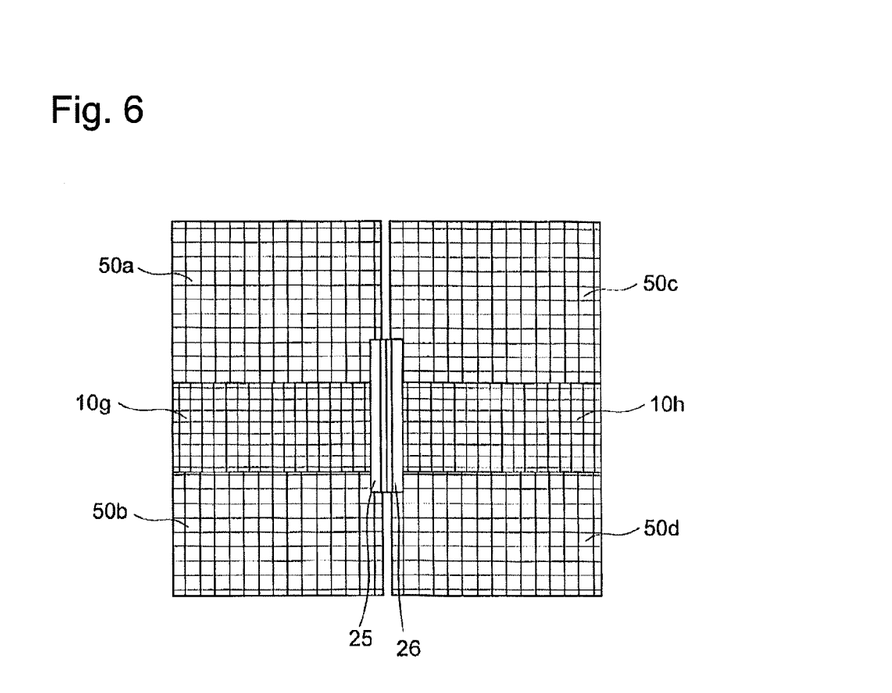
FIG. 6 is a plan view showing the composite material panel structure according to this embodiment.

FIG. 6 is a plan view showing the composite material panel structure according to this embodiment.

As shown in the drawing, in the composite material panel structure according to this embodiment, the composite material panels 10g, 10h having an anti-lightning function, shown in FIG. 5, do not have to be used over the entire structure. In this case, the composite material panels 10g, 10h having an anti-lightning function are disposed at no more than predetermined shield intervals, and conventionally used non-conductive composite material panels 50a to 50d are disposed in remaining parts. The predetermined shield interval is an interval required to prevent disasters caused by lightning strikes, and is set at 5 m×5 m, for example.

Figure 7A:
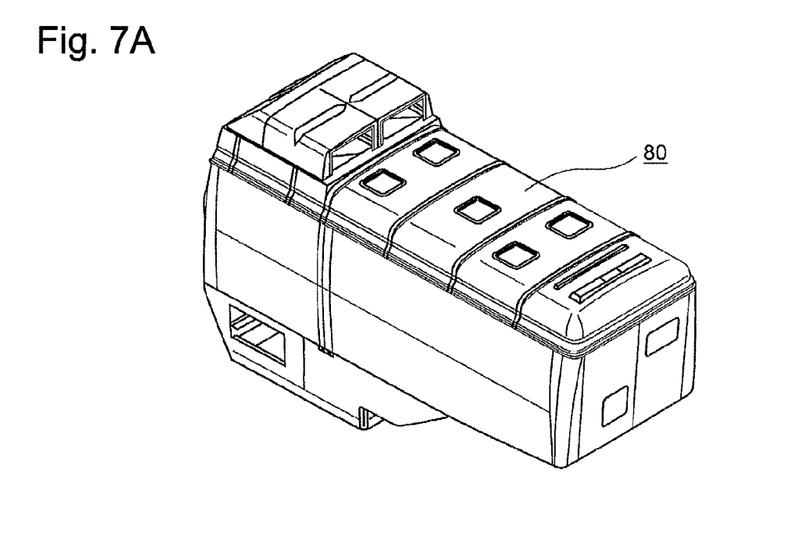
FIG. 7A is a perspective view and FIG. 7B is an exploded perspective view.
Figure 7B:
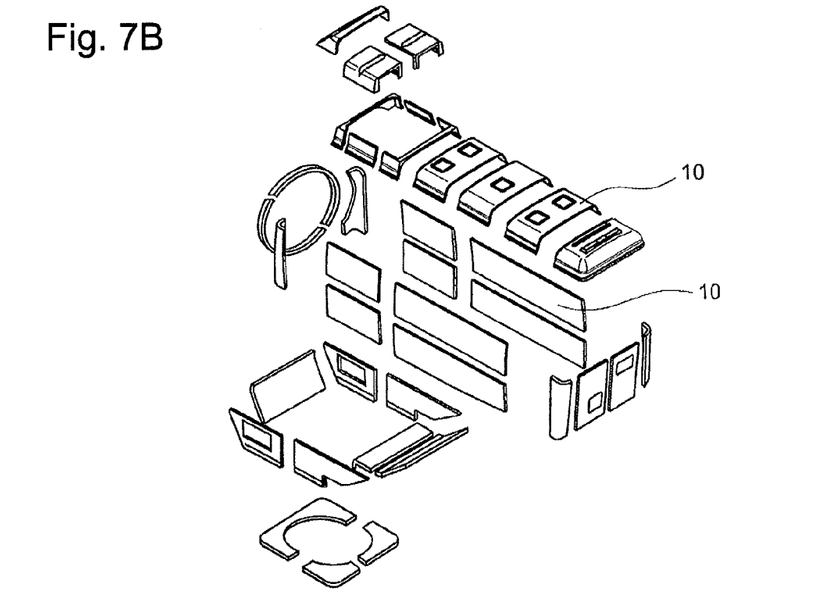

FIG. 7 is a view showing a wind turbine nacelle cover serving as an example of an application of this embodiment, wherein FIG. 7A is a perspective view and FIG. 7B is an exploded perspective view.

A wind turbine typically includes a rotor head to which a rotor blade is attached, a nacelle housing a generator into which a rotation of the rotor blade is input via the rotor head, and a tower which supports the nacelle to be capable of turning in an axial direction. A wind turbine nacelle cover forming an outer shell of the nacelle is disposed in a high location several tens of meters above the ground, for example, and is therefore likely to be affected by lightning. Hence, when the composite material panel structure according to this embodiment is applied to a wind turbine nacelle cover, a lightweight, low cost wind turbine nacelle cover having an anti-lightning function can be provided.

The invention claimed is:

1. A composite material panel structure formed from a composite material panel containing reinforcing fibers, the composite material panel comprising:
   a fiber-reinforced base material impregnated with a matrix resin;
   a conductive mesh sheet disposed on one surface side of the fiber-reinforced base material; and
   a bag film which is disposed on the one surface side of the fiber-reinforced base material so that the conductive mesh sheet is placed between the fiber-reinforced base material and the bag film,
   wherein
   the conductive mesh sheets of a plurality of the composite material panels are electrically connected to each other, and
   the conductive mesh sheet disposed on one surface side of the fiber-reinforced base material is interposed between the bag film and the fiber-reinforced base material in an entire region where the bag film overlaps the fiber-reinforced base material.

2. The composite material panel structure according to claim 1, wherein the composite material panel comprises a conductive connecting end on which an end portion of the conductive mesh sheet that is not covered by said bag film is exposed, and the conductive connecting ends of adjacent composite material panels contact each other.

3. The composite material panel structure according to claim 1, wherein the composite material panel comprises a conductive connecting end formed by exposing an end portion of the conductive mesh sheet that is not covered by said bag film, and the conductive connecting ends of a plurality of the composite material panels are electrically connected to each other via a conductive member.

4. The composite material panel structure according to claim 3, wherein the conductive member is a coupling tool for coupling a plurality of the composite material panels.

5. A wind turbine generator comprising a nacelle cover which is constituted by the composite material panel structure according to claim 1.

6. The composite material panel structure according to claim 1, wherein said bag film is configured to form a molding space between the bag film and a mold for molding said composite material panels when molding the composite material panels, the molding space being configured to receive the liquid matrix resin when molding the composite material panels.

7. A manufacturing method for a composite material panel structure formed from a composite material panel containing reinforcing fibers, comprising the steps of:
   placing a fiber-reinforced base material on a mold and disposing a conductive mesh sheet on an upper surface of the fiber-reinforced base material;
   covering the fiber-reinforced base material and the conductive mesh sheet with a bag film so that the conductive mesh sheet is placed between the fiber-reinforced base material and the bag film in an entire region where the bag film overlaps the fiber-reinforced base material;
   reducing a pressure in a molding space formed between the mold and the bag film;

introducing a matrix resin into the reduced-pressure molding space;

curing the matrix resin;

removing a composite material panel obtained by integrating the fiber-reinforced base material, the conductive mesh sheet, and the bag film from the mold when the matrix resin is cured; and electrically connecting the conductive mesh sheets of a plurality of the composite material panels to each other.

8. The manufacturing method for the composite material panel structure according to claim 7, wherein the composite material panel comprises a conductive connecting end at which an end portion of the conductive mesh sheet is exposed without being covered by the bag film, and in the connecting step, the conductive connecting ends of adjacent composite material panels are electrically connected to each other.

9. The manufacturing method for the composite material panel structure according to claim 8, further comprising a step of removing at least a part of said bag film positioned on said end portion of the conductive mesh sheet so that said end portion of the conductive mesh sheet is exposed.

10. A manufacturing method for a composite material panel structure formed from a composite material panel containing reinforcing fibers, the method comprising:

placing a fiber-reinforced base material on a mold and disposing a conductive mesh sheet on an upper surface of the fiber-reinforced base material;

covering the fiber-reinforced base material and the conductive mesh sheet with a bag film so that the conductive mesh sheet is placed between the fiber-reinforced base material and the bag film;

reducing a pressure in a molding space formed between the mold and the bag film;

introducing a matrix resin into the reduced-pressure molding space;

curing the matrix resin;

removing a composite material panel obtained by integrating the fiber-reinforced base material, the conductive mesh sheet, and the bag film from the mold when the matrix resin is cured; and electrically connecting the conductive mesh sheets of a plurality of the composite material panels to each other, wherein the bag film remains on the conductive mesh sheet in each of said composite material panels of said composite material panel structure obtained through said connecting step.

\* \* \* \* \*